Nov. 15, 1966  G. W. STAMBAUGH  3,285,308
PNEUMATIC CLOSURE
Filed Feb. 6, 1964

INVENTOR
George W. Stambaugh
BY McCoy, Greene, Medert
& Le Grotenhuis
ATTORNEYS

United States Patent Office 3,285,308
Patented Nov. 15, 1966

3,285,308
PNEUMATIC CLOSURE
George W. Stambaugh, Akron, Ohio, assignor to The General Tire & Rubber Company, Akron, Ohio, a corporation of Ohio
Filed Feb. 6, 1964, Ser. No. 342,936
11 Claims. (Cl. 150—8)

This invention relates to pneumatic closure devices and, more particularly, to a pneumatic closure for sealing the access end of a receptacle such as a large rubber coated fabric bag used for transporting liquids or dry powdered materials.

It is desirable that certain types of receptacles be tightly sealed to prevent evaporation of liquids or to prevent the entry of and accumulation of moisture in dry powdered materials contained therein. Pneumatic closures designed for this purpose for use on large multicompartment concrete mix receptacles for transporting the ingredients of concrete mix to the location where a charge is to be mixed and poured, are shown in the U.S. patent application of Beck, Serial No. 262,032, filed March 1, 1963, now Patent No. 3,151,650, and in the U.S. patent application of Slemmons, Serial No. 289,026, filed June 19, 1963, now Patent No. 3,133,575. The devices of these applications show the use of inflatable pneumatic bags for sealing the access ends of two separate concentric compartments located in a large rubberized receptacle.

The closure of the present invention is adapted particularly for single compartment receptacles and provides a convenient and inexpensive means for sealing the receptacle during transportation and storage of the contents therein. The closure utilizes a flat metal plate that fits against the top of a circular ring forming the access to the receptacle, and which is engaged and locked in place by an inflatable annular pneumatic bag which expands inwardly when inflated to seal the flat metal plate over the access to the receptacle. Thus, when sufficient air pressure is introduced into the bag, the walls of the bag will engage the edges of the plate and bulge in over the top thereof to provide a tight seal and to hold the plate firmly in place. The pneumatic bag is preferably formed of rubber coated fabric material and is mounted in the access or throat of the receptacle.

It is among the objects of the present invention to provide a pneumatic closure for a receptacle, which may be used to provide an airtight seal and which may be easily opened to permit the contents of the receptacle to be dumped.

Another object of the present invention is to provide a pneumatic closure for a receptacle, which is of a simple low-cost construction and which tightly seals the contents of the receptacle therein.

It is a further object of the present invention to provide a pneumatic closure for a receptacle, which may be easily installed in the access to the receptacle and which may be easily inflated to seal the receptacle once it has been filled, and deflated when it is desired to dump the contents.

Reference should be had to the accompanying drawings forming a part of this specification in which.

Figure 1:
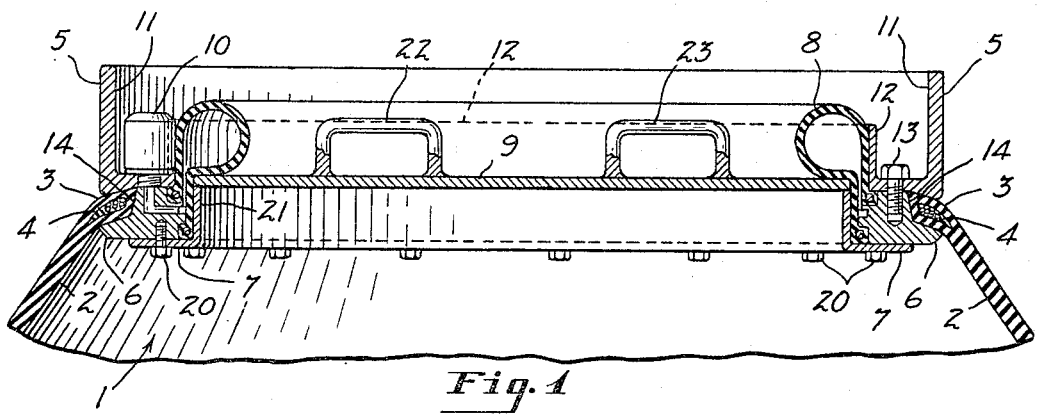
FIGURE 1 is a transverse central section of a pneumatic closure embodying the present invention, showing the pneumatic bag in its inflated condition.

Referring more particularly to the drawings, there is shown a pneumatic closure embodying the present invention and which is adapted for sealing the access end of a large receptacle 1 formed of flexible rubber coated fabric material. The receptacle 1 has a circular wall 2 which terminates at one end in a bead 3 which defines an access or throat for entry into the receptacle. The bead 3 is reinforced with an inextensible bead ring 4 such as those used in beads of pneumatic tires, as disclosed in copending application, Serial No. 153,024, filed May 5, 1964, now Patent No. 3,131,741.

The closure generally comprises an outer frame ring 5, a mounting ring 6, an inner frame ring 7, an inflatable pneumatic bag 8, a closure plate 9, and a valve 10.

Figure 2:
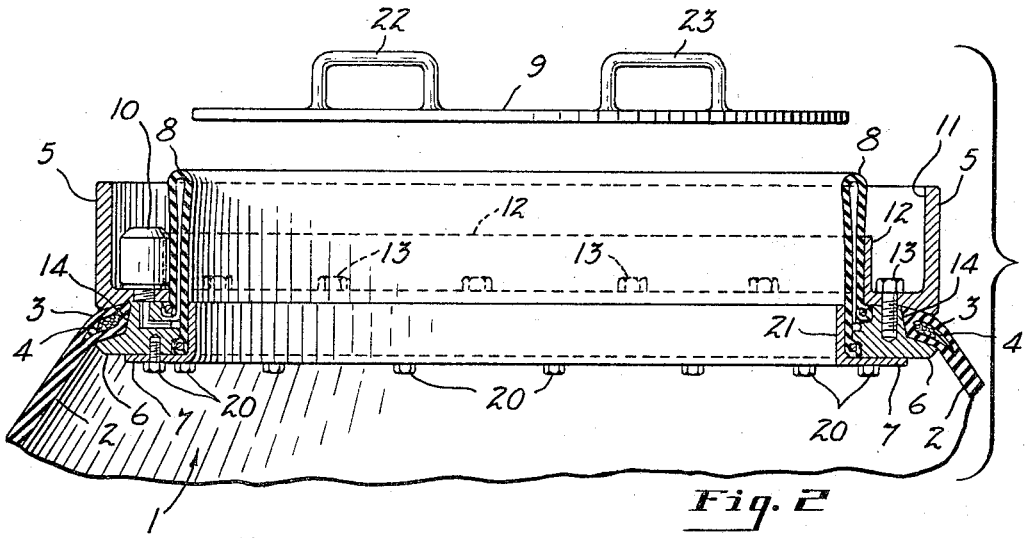
FIGURE 2 is a transverse central section of a pneumatic closure embodying the present invention showing the pneumatic bag in its deflated condition and the closure plate removed.

The outer frame ring 5 has an outer wall 11, which extends upwardly above the other members of the closure and provides a protective barrier to prevent damage to the closure during transportation and storage of the receptacle. The outer frame ring 5 also has an inner wall 12 which engages the annular pneumatic bag 8 and prevents radial outward expansion of the bag when inflated. The outer frame ring 5 is fastened to the mounting ring 6 by means of machine screws 13 passing through the base of the outer frame ring 5 into threaded openings in the mounting ring 6, as shown in FIGURES 1 and 2.

The mounting ring 6 has an annular grooved portion 14 in its outer circumference, which provides a seat for the bead 3. The bead 3 is tightly clamped in the groove 14 by the outer frame ring 5 during assembly of the closure.

Also attached to the mounting ring 6 is the inflatable annular pneumatic bag 8, which is preferably made of a rubber coated (cord) fabric material in the form of a continuous rubber sleeve, having circular wire bead rings 15 and 16 embedded in each end. In assembled relation the bead rings 15 and 16 are tightly seated in annular grooves 17 and 18 formed in the inner circumference of the mounting ring 6. The bead ring 15 is clamped tightly in the groove 17 by the outer frame ring 5, and the bead ring 16 is tightly clamped in the groove 18 by the inner frame ring 7 as best shown in FIGURE 3.

The inner frame ring 7 has a base portion 19 which is fastened to the mounting ring 6 by machine screws 20 passing through the base portion 19 into threaded openings in the mounting ring 6. Extending upwardly from the base portion 19 at the inner edge thereof is a circular wall 21, the top of which provides a seat for the closure plate 9. The outer face of the wall 21 engages the pneumatic bag 8 and the inner face forms a circular opening providing access to the interior of the receptacle 1.

Figure 3:
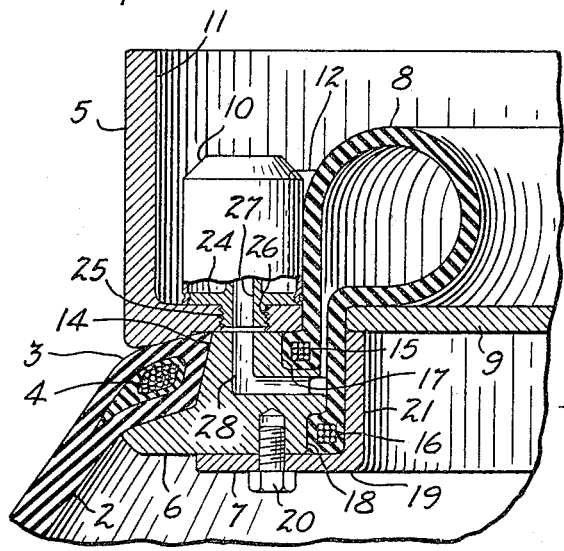
FIGURE 3 is a fragmentary transverse central section on an enlarged scale, showing the pneumatic bag in its inflated sealing condition, and showing the valve used for inflation.

When the closure plate 9 is placed over the opening and seated against the top of the upwardly extending wall 21 of the inner frame ring 7, the pneumatic bag 8 may be inflated and expanded radially inwardly, as best shown in FIGURES 1 and 3, to seal the closure plate in its closed position and thus provide a tight seal for the receptacle 1. The closure plate 9 is provided with handles 22 and 23 to facilitate positioning and removal.

When the bag 8 is deflated as shown in FIGURE 2, the closure plate 9 may easily be removed from the opening, as shown, to permit filling or emptying of the receptacle. If desired, the closure plate 9 may be provided with a chain attached at one end to the bottom surface thereof, and at the other end to the mounting ring 6 to prevent misplacing of the closure plate 9.

The valve 10 is mounted in the outer frame ring 5 and provides a convenient means for inflating and deflating the pneumatic bag 8. The valve 10 may be of the type shown in U.S. Patent application, Serial No. 314,973, filed Oct. 9, 1963 or of any other type suitable for this purpose. The base 24 of the valve 10 has a threaded boss 25 which is received in a threaded opening 26 in the base of the outer frame ring 5, as best shown in FIGURE 3. An opening 27 in the base 24 of the valve 10 communicates with an air passage 28 in the mounting ring 6, which extends to the inner circumference of the mounting ring, between the grooves 17 and 18, to provide an air conduit from the valve 10 to the pneumatic bag 8.

When it is desired to close the access end of the receptacle, the closure plate 9 is first placed in the opening on top of the wall 21 of the inner frame ring 7. The pneumatic bag 8, when in its collapsed or deflated condition, provides sufficient space to position the closure plate 9 within the walls of the bag. A suitable inflation tool attached to a source of air pressure is placed over the valve 10 and the bag is inflated so that it expands inwardly as shown in FIGURE 1. The engagement of the walls of the bag 8 with the closure plate 9 locks the plate in position and provides a tight seal which restricts the entry of moisture into the receptacle and prevents evaporation of any liquids which may be contained therein. With the bag 8 thus inflated, the valve 10 is closed to maintain the sealing pressure in the bag. The receptacle and its contents may then be stored or transported to any desired location, where the contents are to be used.

To open the receptacle, the valve 10 is merely released to deflate the pneumatic bag 8 to the collapsed condition shown in FIGURE 2 and to permit removal of the closure plate 9.

It will be understood that the above description is by way of illustration rather than limitation, and that variations and modifications of this specific device herein shown and described may be made without departing from the spirit of the invention.

Having thus described my invention, I claim:

1. A pneumatic closure for a single compartment receptacle having an upper opening therein comprising, in combination, a frame having an upwardly facing seat surrounding said opening, a removable closure plate having a marginal portion adapted to rest on said seat to close said receptacle, an inflatable pneumatic bag carried by said frame adjacent said seat and surrounding the seat for sealingly engaging the periphery of said marginal portion at the periphery of said seat and for engaging the top of said marginal portion above said seat when inflated, said bag having a deflated position which permits movement of said closure plate upwardly away from said seat to open said receptacle, and means for preventing radial outward movement of said inflatable bag during inflation thereof to cause the inflated bag to move radially inwardly over said top of said marginal portion throughout the periphery of said closure plate to hold the plate in its fully closed position while tightly sealing said opening.

2. A pneumatic closure as defined in claim 1 wherein said bag is formed of an elastic rubber and, when deflated, has a generally cylindrical shape with its axis generally perpendicular to said closure plate.

3. A pneumatic closure as defined in claim 2 wherein the means for preventing radial outward movement of said bag comprises a detachable rigid outer ring surrounding said bag and extending axially upwardly away from said closure plate.

4. A pneumatic closure as defined in claim 1 wherein said pneumatic bag is a fabric reinforced annulus of elastomeric material having beads at its opposite side edges reinforced by inextensible annular bead rings which are clamped in place on said frame radially outwardly of said seat.

5. A pneumatic closure for a single compartment receptacle formed of flexible rubber-coated fabric material and having an upper opening comprising a rigid frame having means for mounting said frame on the upper portion of said receptacle and having an inner ring with an upwardly facing seat surrounding a central opening, a removable closure plate having a periphery of the same shape as said ring and a marginal portion adapted to rest on said seat to close said receptacle, an inflatable pneumatic bag of elastomeric material mounted on said frame at the periphery of said ring for sealingly engaging said marginal portion throughout its periphery at the margin of said seat and for engaging the top of said marginal portion above said seat when inflated, said bag having a generally cylindrical deflated position in which it projects upwardly above said ring and permits movement of said closure plate upwardly away from said seat to open said receptacle, and means for limiting radial outward movement of said inflatable bag to cause the inflated bag to move radially inwardly over the top of said marginal portion throughout the periphery of said closure plate to hold the plate in its fully closed position while preventing leakage between said closure plate and said seat.

6. A pneumatic closure as defined in claim 5 wherein the main portion of said frame is a rigid annular ring having clamping means for detachably connecting said ring to said receptacle.

7. A pneumatic closure as defined in claim 5 wherein the means for limiting radial outward movement of said bag comprises a detachable outer ring mounted on said frame, surrounding said bag and extending axially upwardly from said closure plate.

8. A pneumatic closure as defined in claim 7 wherein said pneumatic bag is a fabric-reinforced annulus of elastomeric material having inextensible beads at its opposite side edges, one bead being clamped in place between said inner ring and the main portion of said frame, said main portion having clamping means for connecting said frame to said receptacle.

9. A pneumatic closure as defined in claim 8 wherein the main frame portion has two recesses for receiving the inextensible beads of said bag, and wherein said inner and outer rings clamp said beads in place in said recesses.

10. In combination, a single compartment concrete mix receptacle formed of flexible rubber-coated fabric material and having an upper opening surrounded by an annular wire-reinforced bead, a pneumatic closure for said receptacle comprising a rigid frame having a main portion comprising an annular ring having clamping means for detachably connecting said ring to the bead of said receptacle, said frame having a detachable inner ring with an upwardly facing seat surrounding a central circular opening concentric to said bead, a removable circular closure plate having substantially the same external diameter as said inner ring and a marginal portion adapted to rest on said seat to close said receptacle, an inflatable pneumatic bag of fabric-reinforced elastomeric material mounted on said main portion at the periphery of said inner ring for sealingly engaging the periphery of said marginal portion at said seat and for engaging the top of said marginal portion above said seat when inflated, said bag having a deflated position which permits movement of said closure plate upwardly away from said seat to open said receptacle, and means for limiting radial outward movement of said inflatable bag to cause the inflated bag to move radially inwardly over the top of said marginal portion to hold said plate in its fully closed position, said last-named means comprising a detachable outer ring mounted on the top of said main portion surrounding said bag and extending axially upwardly from said closure plate.

11. A combination as defined in claim 10, wherein the bead of said concrete mix receptacle is clamped between the marginal portion of said outer ring and the underlying radially outer part of the main portion of said frame.

References Cited by the Examiner

UNITED STATES PATENTS

| | | | |
|---|---|---|---|
| 1,319,464 | 10/1919 | Durbin | 285—97 X |
| 2,054,492 | 9/1936 | Young | 285—97 X |
| 2,306,990 | 12/1942 | Essl | 277—34 X |
| 2,612,924 | 10/1952 | Cunningham | 150—1 |
| 2,697,534 | 12/1954 | Topley | 217—78 |
| 3,040,393 | 6/1962 | Dailey | 20—69 |
| 3,131,741 | 5/1964 | Darling et al. | 150—1 |
| 3,133,575 | 5/1964 | Slemmons | 150—1 |
| 3,142,234 | 7/1964 | Maloon | 20—69 X |
| 3,151,650 | 10/1964 | Beck | 150—1 |

FOREIGN PATENTS

| | | |
|---|---|---|
| 108,934 | 8/1917 | Great Britain. |
| 260,115 | 10/1926 | Great Britain. |
| 494,402 | 10/1938 | Great Britain. |
| 327,424 | 3/1958 | Switzerland. |

JOSEPH R. LECLAIR, *Primary Examiner.*

GEORGE O. RALSTON, M. L. MINSK,
*Assistant Examiners.*